(12) United States Patent
Fay et al.

(10) Patent No.: US 11,150,637 B2
(45) Date of Patent: Oct. 19, 2021

(54) SYSTEMS AND METHODS FOR ASSET MANAGEMENT USING A DIGITAL AVATAR

(71) Applicant: Schlumberger Technology Corporation, Sugar Land, TX (US)

(72) Inventors: James Fay, Katy, TX (US); Christopher Del Campo, Houston, TX (US); Ke Li, Sugar Land, TX (US); Paul Cormier, Sugar Land, TX (US); Luis Lopez, Sugar Land, TX (US); Stephanie Elstrop, Houston, TX (US); Clare Schoene, Sugar Land, TX (US); Fei Song, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/418,044

(22) Filed: May 21, 2019

(65) Prior Publication Data
US 2020/0371504 A1    Nov. 26, 2020

(51) Int. Cl.
*G05B 19/418* (2006.01)
*B23Q 17/00* (2006.01)

(52) U.S. Cl.
CPC ....... *G05B 19/4188* (2013.01); *B23Q 17/007* (2013.01); *G05B 19/4183* (2013.01); *G05B 19/4187* (2013.01); *G05B 19/41885* (2013.01)

(58) Field of Classification Search
CPC .......... G05B 19/4188; G05B 19/41885; G05B 19/4183; G05B 19/4187; B23Q 17/007
See application file for complete search history.

(56) References Cited

U.S. PATENT DOCUMENTS

| | | | |
|---|---|---|---|
| 2005/0209836 A1* | 9/2005 | Klumpen | G06Q 10/06312 703/10 |
| 2015/0066712 A1* | 3/2015 | Altieri | G06Q 10/087 705/28 |
| 2017/0183963 A1 | 6/2017 | Al-Dosary et al. | |

* cited by examiner

*Primary Examiner* — Tejal Gami (57) ABSTRACT

An asset management system that includes a field asset management system; a maintenance management system; and a digital avatar associated with a specific asset. The digital avatar has an automatic Model that is customized for the associated asset. The digital avatar automatically receives information from at least one of the field asset management system or maintenance management system as information associated with the asset is entered into the at least one of the field asset management system or maintenance management system. The automatic Model automatically runs with the new information and provides a new operating parameter for use by at least the field asset management system.

26 Claims, 4 Drawing Sheets

SYSTEMS AND METHODS FOR ASSET MANAGEMENT USING A DIGITAL AVATAR

BACKGROUND

Asset management traditionally uses standard generic maintenance schedules that provide large safety factors to operation parameters of field equipment. This is done because of the difficulties in processing equipment health data taken in the field and provided to a system. Another deficiency in traditional maintenance systems is that there are several disconnected databases and/or systems that are sometimes not actively synchronized with one another, and none of them include universally linked automatic models configured individual to specific unique assets.

Therefore, there is a need for an asset management system that uses automatic models that react automatically to input data from the field and provide tailored output data to the field database. Furthermore, there is a need for a system that incorporates a digital avatar, which contains uniquely configured automatic models, of an asset for the lifetime of the associated asset.

SUMMARY

An asset management system that includes a field asset management system; a maintenance management system; and a digital avatar associated with a specific asset. The digital avatar has an automatic model that is customized for the associated asset. The digital avatar automatically receives information from at least one of the field asset management system or maintenance management system as information associated with the asset is entered into the at least one of the field asset management system or maintenance management system. The automatic model automatically runs with the new information and provides a new operating parameter for use by at least the field asset management system.

An asset management system includes a database. The database is in communication with a model management system. The model management system comprises a data management module and one or more models. The data management module configures a processor to receive new input data entered into the database. The data management module also configures the processor to identify the asset associated with the new input data and the parameters associated with the new input data. The processor is further configured to automatically provide at least a portion of the new input data to a model associated with the identified asset as input data and to run the model to receive a new output based on the new input data for the associated asset.

An asset management method includes customizing a digital avatar template to correspond to a unique asset. The customization includes using manufacturing information that includes unique geometry, one or more asset identification codes, and measured material properties of the asset to customize an automatic model; thereby, forming an asset digital avatar. The automatic model is configured to provide at least one operating parameter of the asset as an output. The method also includes linking the asset digital avatar to existing company systems, and automatically updating the asset digital avatar, with at least one processor, as new information on the associated asset is entered into the company systems. The method further includes automatically generating a new output with the asset digital avatar and automatic model, using at least one processor, to generate a new output; and automatically providing the new output to at least one of the company systems, using at least one processor.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
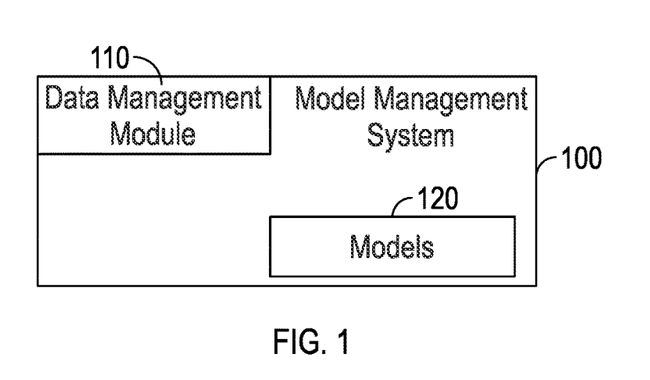
FIG. 1 depicts a schematic of an example model management system.

FIG. 1. depicts a schematic of an example model management system. The model management system 100 includes a data management module 110 and one or more models 120. The data management module 110 can include communication protocols and processing instructions. The data management module 110 can be in communication with one or more processors. The processors can be distributed processors, cloud-based processors, local processors, or combinations thereof. Any number of processors can be in communication with the model management module 110. For example, 1 processor, 2 processors, 10 processors, 20 processors, or 25 processors can be in communication with the model management module 110. Hereinafter, the one or more processors in communication with model management module 110 will be referred to as model management processor.

The communication protocols allow the model management module 110 to talk with one or more databases. The protocols for receiving the information can be Open Data-Base Connectivity (ODBC); TCP/IP Protocol; Distributed Relational Database Architecture (DRDA) protocol, Database Change Protocol (DCP), HTTP protocol; other now known protocols, future known protocols, or combinations thereof.

The processing instructions configure the model management processor to retrieve information from one or more databases, using the protocols, and the processing instructions also instruct the model management processor 120 to process the data and route appropriate data to one or more models 120 as an input.

The model management processor can also be configured to receive outputs from the model. The model management processor can provide data tagging to the outputs. The data tags can be used by one or more processors, which can include the data management processor, to input the data into an appropriate location in one or more databases.

The model management module 110 includes one or more computer instructions stored on computer readable medium that when executed by the model management processor causes the model management processor to perform the following: detect when new input is provided to a linked database, process and map the data from the database to the appropriate input for the model; automatically cause the model to run the simulation after receipt of input from the database, and automatically process the output from the model to configure the output to be mapped to an appropriate location in the database. In one or more embodiments, the model management processor can be configured to send the data to the database and store the data in the appropriate location. In another embodiment, the model management processor can send the appropriately processed data to a connected system, and an additional processor can use the data tags associated with the data to locate the appropriate database and input the data into the appropriate location.

The model management module can detect new inputs into a linked database by receiving a signal sent by a processor and a communication module in communication with the database indicating new data has been received, a signal received by the model management processor which is in communication with the database, or combinations thereof.

The signal can be sent by a user who inputs the data clicking a save button on a user interface, which sends a signal to the model management processor or another processor in communication with the database, or combinations thereof.

The signal can also be sent automatically if a processor, which can be in communication with the database, detects that new data has been received. This can be done by a processor in communication with the database comparing a historical database to an active database at a predetermined interval. For example, the comparison can occur every millisecond, 100 milliseconds, 1 second, 10 seconds, 1 minute, 1 hour. The predetermined interval can be any desired interval of time. For example, one or more processors in communication with the database can be configured to compare a prior historical database, i.e., a copy of the active database last updated at the end of the preceding interval, at a time lapse from the end of the last update, such as 10 seconds, if the processor determines that there is now additional data in the active database it can send a signal to the data management module, and the data management module can then instruct the processor linked to the model management system to retrieve the newly inputted data from the database.

In one or more embodiments, the data management processor can be instructed to take actions from computer instructions in the data management module. For example, the data management processor can be in communication with the database and can compare a historical database, stored in a historian in communication with the data management processor and the database, to an active database at a predetermined interval. For example, the comparison can occur every millisecond, 100 milliseconds, 1 second, 10 seconds, 1 minute, 1 hour. The predetermined interval can be any desired interval of time. For example, the model management processor can be configured to compare a prior historical database, i.e., a copy of the active database last updated at the end of the preceding interval, at a time lapse from the end of the last update, such as 2 seconds, if the processor determines that there is now additional data in the active database, it can retrieve the new input from the database.

The newly inputted data can be received by the model management module 110. And a set of computer instructions can instruct the model management processor to process and map the data from the database to the appropriate input for the model. For example, the computer instructions can instruct the processor to identify a data tag or tags associated with a specific asset, a data tag or tags associated with a specific data type, such as diameter, pressure, or temperature, and then once the correct data is identified provide the required data as an appropriate input to the model.

The processor can then automatically cause the model to run at least one simulation after receipt of input from the database by running the algorithms of the model. In one or more embodiments, the calculations on the inputs can be performed to create a modified input. The model will use the identified new data associated with the appropriate input and/or the modified input and provide an output. The output will be tied to a specific data type. The model management module will then instruct the processor to tag the data with appropriate identifiers that the database can use to determine the appropriate location to store the output and/or also associate the data with at least one input. For example, the output of the model can be max pressure for asset A100, and the processor will tag the data accordingly so that it is placed in the appropriate location in the database. For example, the model management processor can identify a location for max pressure of asset A100 and store it in the open location, thereby, updating the max pressure for A100 to the new max pressure, which can then be made available to an inventory management module, a job planning module, other linked module, or combinations thereof. In one or more embodiments, the method can include running one or more models a plurality of times and receiving a plurality of results. The plurality of results can be combined to provide a final input for one or more models.

Figure 2:
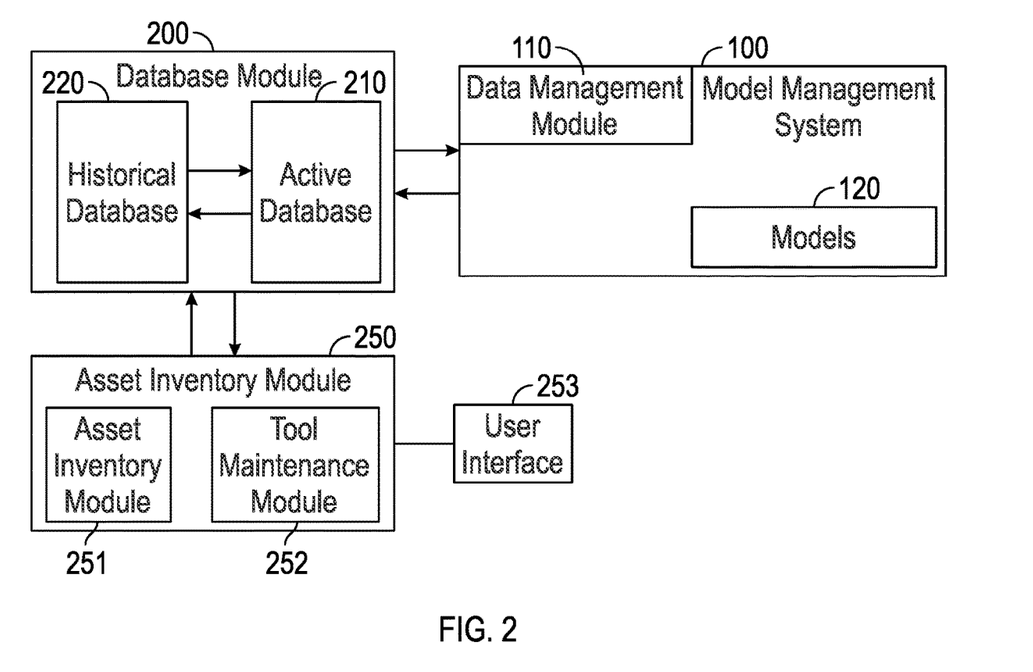
FIG. 2 depicts a schematic of an example asset management system.

FIG. 2. depicts a schematic of an example asset management system. The asset management system can include an asset management module 250, a database module 200, and the data management module 100.

The asset management module 250 can have a local data storage that stores data received from the database module 200 in a manner that can be easily searched and viewed by a user using user interface 253. For example, the asset management module 250 can contain an asset inventory module 251. The inventory module can have a tool maintenance module and inventory module. In one or more embodiments, the asset management module 250 can communicate with the cloud, and a processor in communication with the asset manager can be configured by computer instruction in the asset management module 250 to query the database module 200 to obtain data matching the query and present to the user in a viewable manner on the user interface 253.

A processor can be in communication with the asset management module 250 and the user interface 253. The asset management module 250 can include computer instructions and protocols to configure a processor to search the data in the database based on input from the user. The input can be the type of tool needed, the max operating pressure, the max operating temperature, etc. For example, the user using the user interface 152 can query for a logging tool for a job to have an operating temperature of 170° C. The configured processor, which one skilled in the art with aid of this disclosure would know how to configure with appropriate programming, would conduct the search and return the results to the user on the user interface 153. In one or more embodiments, the data can be streamed to the data storage on assigned channels allowing the database to be associated with a specific channel which allows that data to be stored in the appropriate location in the database, the data can have identification information that allows that data to be stored in the appropriate location in the database, the input data can be entered manually using a textual interface into a location associated with the specific type of data that allows that data to be stored in the appropriate location in the database, or combinations thereof, and the processor can be configured to check the assigned locations of the database to identify data and return results. In addition, the asset management system can also have a tool maintenance module 252. The tool maintenance module 252 can include computer instructions and protocols to configure a processor to input new data to the database module 200 based on input from the user. The input can include the number of hours the tool was run on a job, any maintenance activity performed on the tool, measurements of points of an outer diameter of a housing, or other relevant information. The configured processor, which one skilled in the art with aid of this disclosure would know how to configure with appropriate programming, would send the input data with appropriate tags to the active database 210 in the database module 200. And the new data would be stored in the appropriate location associated with the asset associated with the input, and the information inputted will be categorized appropriately based on data tags or other metadata.

The model management processor, in this example; however, as discussed herein in other embodiments can be used as well, will be actively comparing the active database 210 to a historical database 220. The model management processor will detect that new data that is not in the historical database 220, and the model management processor will retrieve the new input data, identify the important data, i.e., based on the required model inputs, and be configured to provide the appropriate data to the model as inputs. The processor would then be configured to run the algorithms of the model and obtain an output that will provided one or more new specifications of the asset, e.g., max operating temperature, max operating pressure, identified weak point in a tool, etc. One skilled in the art with the aid of this disclosure would know how to build necessary models and configure the processor using computer instructions in communication with the data management processor.

The model management processor can also be configured, by computer instructions in the data management module 110 and the protocols stored therein, to provide the new outputs to the active database 210 and use data tags and database structure to store the data in the appropriate location in the active database and update relevant specifications with the new output specifications.

Figure 3:
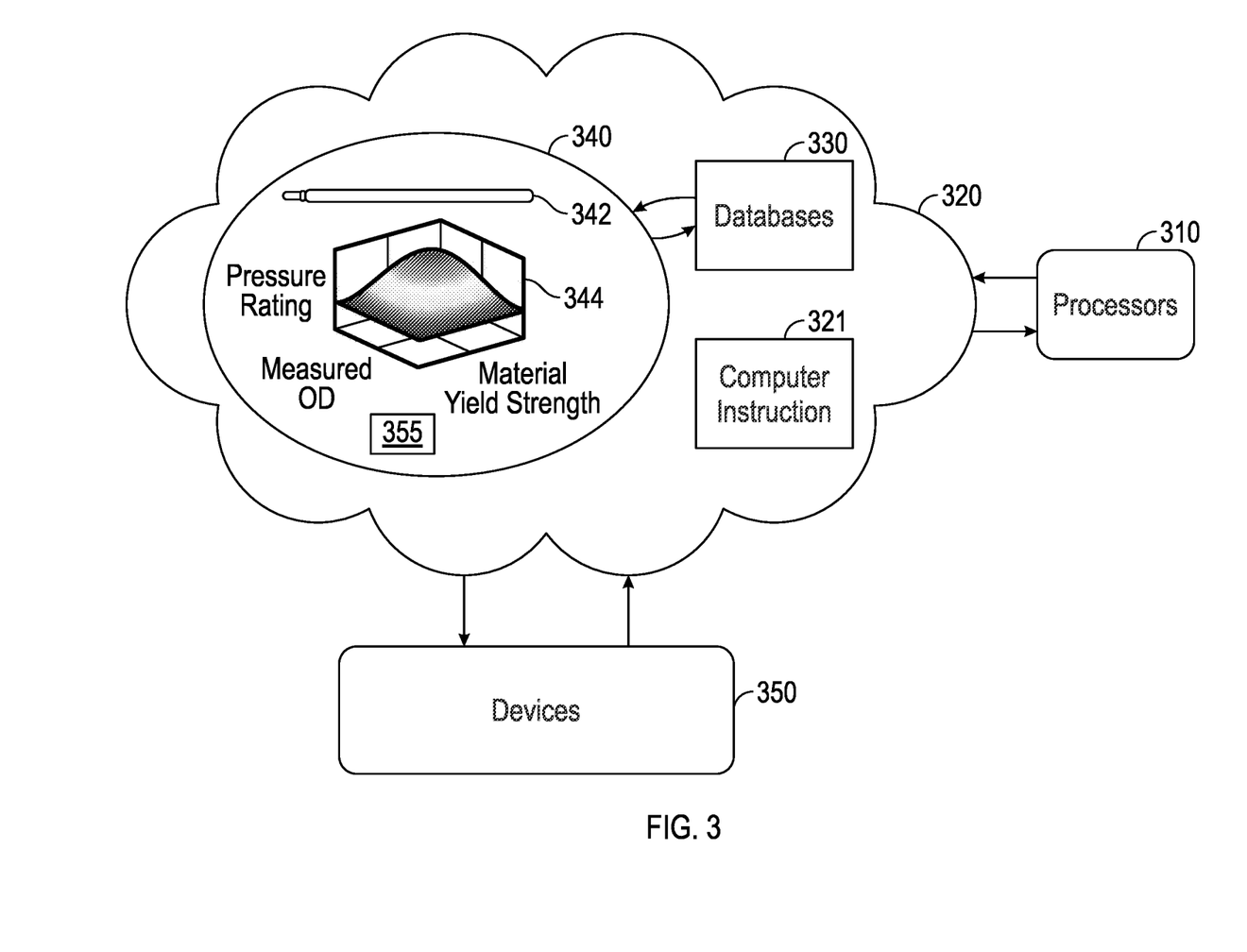
FIG. 3 depicts a schematic of another example asset management system that includes a digital avatar of an asset tied to a model specific to the asset.

FIG. 3. depicts a schematic of model management system that includes a digital avatar of an asset tied to a model specific to the asset. This embodiment can be used in a system as described in FIG. 2, e.g., by placing the digital avatar in the data management module. One skilled in the art would know how to modify or combine the embodiments in FIG. 2 and FIG. 3 to configure the system in any number of configurations.

The system includes one or more processors 310 in communication with the cloud 320, one or more user interfaces and/or devices 350 in communication with the cloud 320, one or more digital avatars 344 stored in the cloud, computer instruction located in the cloud 321, and one or more databases 330 located in the cloud.

The computer instructions can configure the processor, one skilled in the art with the aid of this disclosure would know how to configure the processor, to identify when new data is inputted into the database 330. For example, when a user uploads data into the database 330, the processor can be configured to detect the upload to the cloud and can be configured to place the input data into the database 330 and provide the input data to the appropriate avatar associated with the asset associated with the input data. The processor can be configured to process the data using metadata, data tags, other identifiers, or combinations thereof to determine the asset associated with the input and type of parameters to which the input applies. Accordingly, it will be able to store in the appropriate location in the database and provide correct inputs to the model. The processor can also be configured to execute the algorithms of the model and obtain an output. The processor can also store asset specific information in the digital avatar data storage 355 in the appropriate location; thereby, updating the digital avatar 340. The output from the model 344 can then be placed into the database as a new specification for the appropriate asset. The database 330 can then be used to update asset availability. For example, when a field person needs a similar asset and queries the database 330, the processor can send the new operating parameter for the asset and if it can be used on the planned job based on the job parameters and the specifications of the asset.

Figure 4:
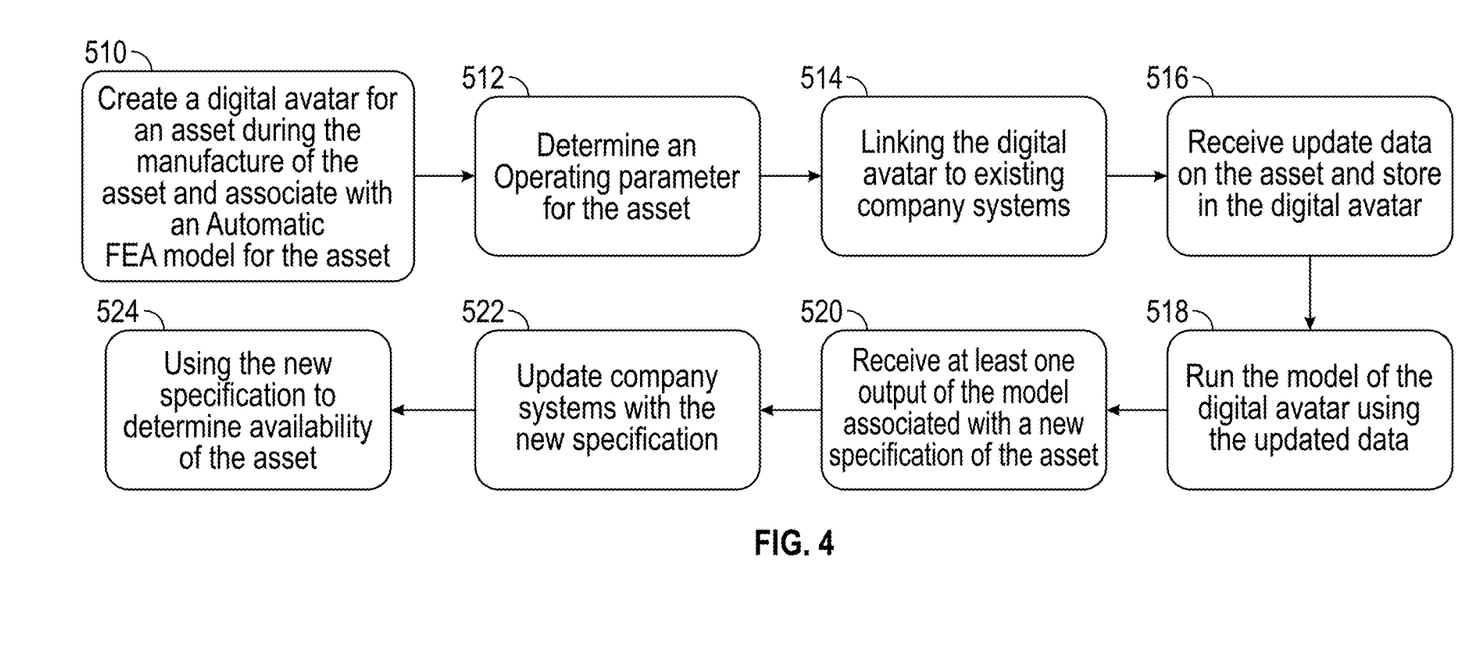
FIG. 4 depicts a flow diagram of an embodiment of an asset management method.

FIG. 4 depicts a flow diagram of asset management method.

The method can include creating a digital avatar for an asset during the manufacture of the asset and associating the digital avatar to an automatic model for the asset, at box 510. In one or more embodiments, the digital avatar will include a database that has the birth records of the associated asset and will be used to store all data entered on the asset during the life of the asset. The birth records can include true material properties, true geometry of the asset, important check points of the asset, and the like. The digital avatar also includes an automatic model that is tailored to unique aspects of the asset, e.g., the true material properties, the true geometry of the physical asset, the modes of failure, and the like. The automatic model is configured to provide an output on an operating threshold of the asset. For example, if the asset has a mode of failure of pressure collapse, the automatic model can be used to predict at what pressure the specific asset, with the specific material properties and specific geometry will fail, and the max pressure until failure will be the max operating pressure.

The method can also include determining an operating parameter for the asset, at box 512. For example, the operating parameter can be determined by training and tuning the model to find the operating parameter to obtain manufacturing acceptance at the calculated rating. Also, calculations outside of the model can be used to adjust the operating parameter, for example calculations can be performed to determine the pressure rating for two failure modes, such as collapse and overstress as well safety factors can be used to set an operating parameter rating, such as a pressure rating. Other operating parameter ratings can be temperature, fatigue, tension, compression, dog leg severity, or other known or future known operating parameters.

The method can also include linking the digital avatar to existing company systems, at box 514. Existing company systems can include SAP™, iWill™, software available from Actenum™, commercially available or existing manufacturing management systems, work order management systems, field asset management systems, such as those available from Apptricity™ or other commercially available or known or future known systems for manufacturing management, field asset management, workorder management, job planning, a now known or future known business system that can be used to manage assets, manufacturing data, business data, the like, or combinations thereof.

The digital avatar then receives data generated from the company systems, at box 516. For example, the digital avatar will get birth information, i.e., material properties, defects, serial number, and the like, from the manufacturing management system. Furthermore, as the asset is deployed the avatar will get information from the asset management system, and as maintenance is performed in the workorder system.

The method also includes running the model of the digital avatar using at least a portion of the updated data, at box 518. For example, the updated data can include seal replacement information, surface finish information, outer diameter along one or more points of a tool, component switch out, or the like; however, the model may only require an outer diameter along one or more points; therefore, the model will use only the portion of the updated data that is required. In other situations, the model may require all updated data as input data or may require multiple types of updated data or combinations of updated data as input data, such as surface information and outside diameter information.

The method then includes receiving at least one output of the model associated with a new specification of the asset, at box 520, updating one or more company systems with new specification, at box 522, and using the new specification to determine availability of the asset for a job with specific operating conditions, at box 524.

Figure 5:
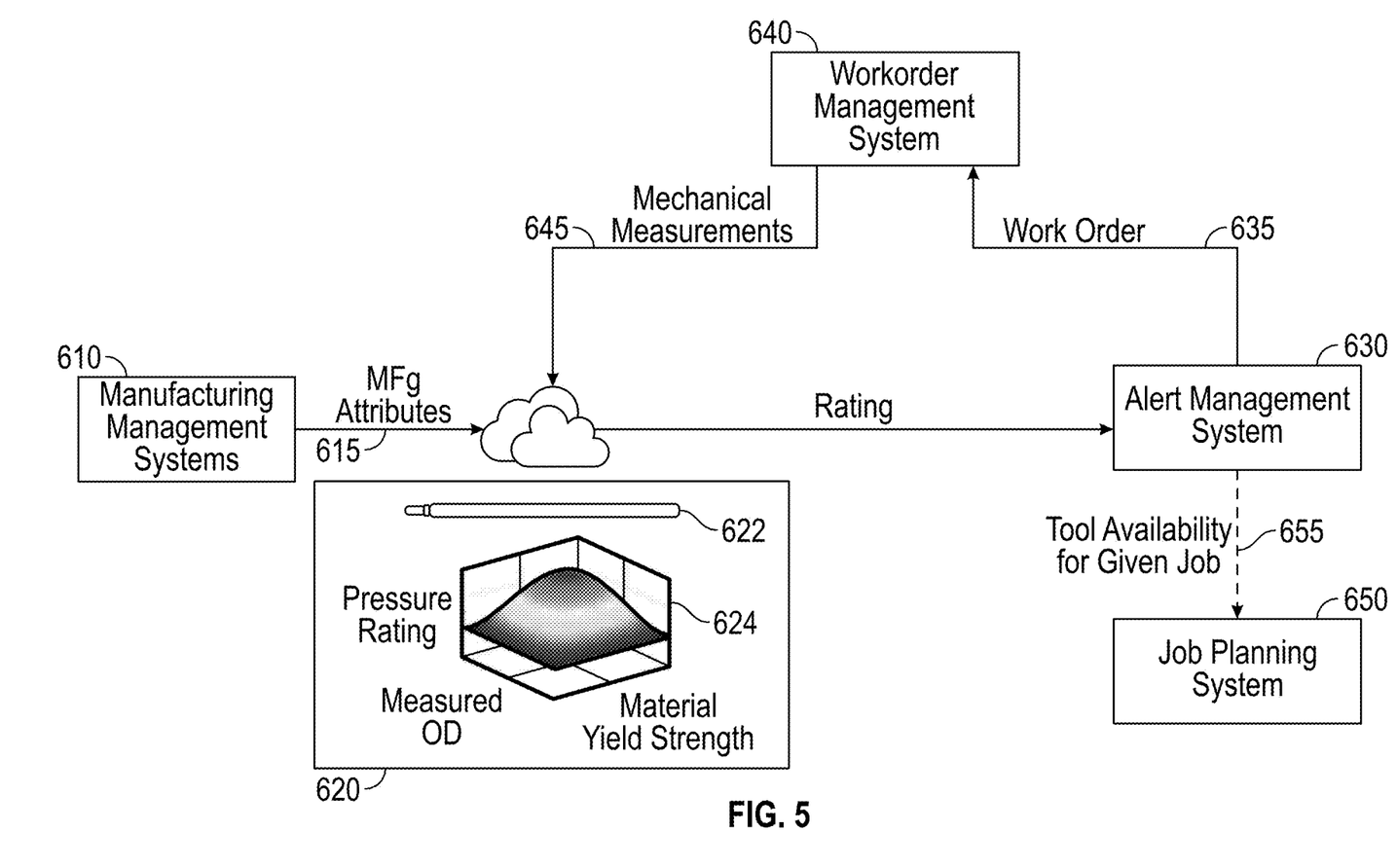
FIG. 5 depicts a workflow for an asset management system.

FIG. 5 depicts a workflow for an asset management system. The asset management system can include one or more company systems. The company systems as depicted are manufacturing management system 610, field asset management system 630, job planning system 650, and workorder management system 640. The management systems are linked to the digital avatar 620. Other company systems can be used as well. Different combinations of systems can be used and can include one or more of the systems depicted in addition to other company systems.

The manufacturing system 610 can be used to obtain manufacturing data during the creation of the asset, and the obtained manufacturing attributes can be stored in a database of the digital avatar for the asset 615. The digital avatar 620 can be created for the asset during manufacturing, for example using a preconfigured template corresponding to the asset and a model architecture 624 for the asset and digital image of the asset 622. The manufacturing attributes in addition can be supplemented using input provided using a graphical user interface in communication with the digital avatar 620. After input from the graphical user interface and manufacturing attributes are provided to the digital avatar, a customized specific digital avatar of the asset is created. The model can be configured to link to the asset in the company systems by giving the created digital avatar the same identification number as the asset.

The digital avatar, once the model 624 is properly tuned and customized, can use the model 624, the manufacturing attributes, and user inputs to calculate one or more ratings for the asset, for example temperature rating, workload rating, pressure rating, or the like. The calculated one or more ratings can then be sent to the field asset management system 630. The field asset management system 630 can use the one or more of ratings to identify if the asset is available for a job, based on inputs to the job planning system 650. The field asset management system 630 can send available assets 655 to the job planning system 650 identifying the assets that can use the required operating conditions. The asset can be sent for scheduled inspection and maintenance based on a predetermined schedule or as needed.

The field asset management system 630 can send a workorder 635 to the workorder management system 640 for the asset. Once the maintenance is performed, properties of the asset and maintenance information of the asset can be entered into the workorder management system. The workorder management system will then send the workorder information and updated measurements 645 of the asset to the digital avatar having the same identification number of the asset. The digital avatar can then use the new information to calculate a new pressure rating. For example, the asset can be tool housing. A "Housing Digital Avatar" can be selected from choices of housing avatars, which can be stored in the cloud. The Housing Digital Avatar can be modified with information from the manufacturing inspection, e.g., material strength from tensile testing and exact geometry of the housing. The Housing Digital Avatar will have architecture for Automatic Models for multiple sections which are unique along the length of the asset for both failure modes of collapse and overstress cases. The architecture for Automatic Models can be 3D architectures, FEA model architecture, other architectures, or combinations thereof. For example, the architecture for Automatic Models can have a complete 3D CAD model of the geometry of the asset or a half model to simply the model if appropriate.

A user can use a graphical user interface (GUI) to modify the Digital Housing Avatar. The GUI takes information from the user to complete the Multiple Automatic FEA Calculations needed to be able to determine the current pressure rating of the housing and to be able to complete validation during manufacturing acceptance testing at this unique pressure rating. Further, manual calculation or the Housing Digital Avatar can be used to determine the pressure rating from the two failure modes of collapse and overstress using an acceptable safety factor; as such a unique Housing Digital Avatar is created and linked with that asset in all company systems by associating an asset identification number of the asset with the Housing Digital Avatar.

After manufacturing acceptance testing at the manufacturing location the birth record is recorded in the Housing Digital Avatar, so it is ready for use in the field for this serial number asset. The asset will then be used to complete jobs in the field, and during normal service levels for maintenance the housing is inspected for outer diameter to be able to determine the reduction in pressure rating as the housing wears during normal operation downhole. The Housing Digital Avatar has a database that stores birth records initial pressure testing from the manufacturing center, and updated information as it is received; thereby, enabling the asset to be tracked with time to determine wear rates and expected life for asset planning purposes for ordering new assets. The reduction of the pressure from this initial value at the center can be determined by the Housing Digital Avatar by using the customized model to determine the actual pressure rating from the current geometry which is inspected in the field. This actual pressure rating can be displayed in a field asset management system to be able to be used for operational efficiency.

In one or more embodiments, the Housing Digital Avatar allows the FEA geometry to be unique per asset serial number if the manufacturing process has a non-conformance and the engineer determines that this is a useful asset for the majority of the pressure rating needed for operation in the field. The Housing Digital Avatar will have the capability to have one or more morphology/geometry options for a given design. Each serial number would have a single morphology. To be clear, the morphology needs to be a discrete selection that drives the available parameters that can be filled out for a housing. For example, one housing may have two keyways to represent a manufacturing error, and the keyway location and dimensions can be parameterized to allow any such housing to be represented by data. This morphology might be called 2K, while a standard morphology might be called STANDARD. Without selecting 2K as the morphology, the parameters for a $2^{nd}$ keyway location and dimensions would not be available to the user. As new morphologies are encountered (one flat side housing for wear, missing feature, etc.), they could be added to the list of available morphologies for a given serial number of the housing.

In one or more embodiments, the Housing Digital Avatar can also include model architectures that can be customized to match the associated asset, these models can be used to determine operating temperature for the asset; tension and compression rating of the asset; and maximum dog leg severity for the asset. In one or more embodiments, the Housing Digital Avatar can have algorithms, which would be known by one skilled in the art with the aid of this disclosure to provide maximum temperature for the asset. In one or more embodiments, one or more of the models can be any type of model and can be used to calculate one or more operating parameters or conditions of the asset. For example, the operating parameters or conditions of the asset can include maximum tension, maximum compression, maximum temperature, and maximum dog leg severity for the asset using the calculated pressure rating of the asset as well as the actual material strength properties and actual geometry. The automatic model can have any number of constraints, inputs, and the like.

In one or more embodiments, the Housing Digital Avatar can be used to determine the maximum tension along the housing. The Housing Digital Avatar can also be combined with one or more digital avatars of a weak point, and the Housing Digital Avatar and weak point digital avatars can work together to show the actual point that will yield first. This can be used to aid in fishing jobs or to determine the pull force that can be applied to a stuck tool.

In one or more embodiments, the model described herein can be any model. For example, the model can be a reduced order model, a Finite Element Analysis (FEA) model, a Computational Fluid Dynamics (CFD) model, a statistical model, a neural network model, one or more surrogate models, now known or future known analytic models, or combinations thereof.

In one or more embodiments, the asset management system can have one or more algorithms to cause a processor to check for new data in one or more databases. The asset management system can also include one or more instructions to cause the processor to initiate a model sequence. The model sequence can include running a single model at least once, running a series of linked models in parallel at least once. In one or more embodiments, outputs from linked models can be an input to another linked model. In one or more embodiments, one or more reduced order models can run at least once as a standalone model or as a linked model.

Pressure induced collapse is the first failure mode for a tool housing, which could take place in a plurality of sections in the middle of the housing. The geometry for each of these sections is of a clean morphology, i.e., having no geometric features as stress risers, and can be mathematically described with an inner diameter (ID), outer diameter (OD), and an eccentricity. The geometry that is used for the FEA model to predict the pressure rating must be parameterized. The critical dimensional parameters, including the inner diameter (ID), outer diameter (OD), and eccentricity that mathematically describe the morphology of the new or worn housing shall be defined. The geometry can then be reconstructed in an FEA preprocessor, followed by meshing and definitions of a material model, loads, boundary conditions, and a criterion for determination of the pressure rating. Here, three load types are included in the FEA model, namely, pressure, bending, and tension. A nonlinear solver is then invoked to run the simulation and the pressure rating is determined by evaluating the solution against the pre-defined criterion. The FEA model structure is generally applicable to each housing section identified for pressure rating prediction. Upon import of the critical dimensions, the FEA workflow is automatically executed to compute the pressure rating for one given section. In order to determine a pressure rating efficiently without comprising accuracy upon knowing the measured geometry and material properties, FEA simulations could be run offline with each critical dimensional parameter either fixed at a conservative value or ranging from the lower limit to the upper limit with a pre-defined increment. A design of experiment method may be used to determine the sample simulation cases, along with the domain knowledge of the problem, to substantially reduce the sample size while predicting conservative pressure ratings. A machine learning technique, such as a regression method, can then be applied to fit the predicted pressure ratings and generate a surrogate model. Using the surrogate model to predict a pressure rating for any given housing section with known inputs is instantly efficient because no FEA simulation is required. The second failure mode is overstress of the end sections of a housing or the joint between two adjacent housings induced by pressure, bending, and tension or compression. The end sections may have thinner walls than the middle sections of a housing, but they may be very short or are supported by internal components such that pressure induced collapse is not a concern. They could also contain stress-rising features. When a substantial axial load (tension or compression), along with pressure and bending, is applied, such an end section may fail before the middle sections do. The joint between two adjacent housings may also become the weak link due to the complicated features included and contact interactions involved. To automatically determine the rating for one load type with the others known, the geometry that well captures the morphology of a new or worn housing must be parameterized, and automatically reconstructed and meshed with the loads, boundary conditions, and a criterion for load rating defined in an FEA preprocessor. A nonlinear FEA solver is then automatically invoked to run the simulation to determine the load rating based on a pre-defined criterion. Such an automatic FEA model may be applicable to one or multiple weak sections. If the morphologies of the different sections differ, distinct customized FEA models will have to be constructed. For each class of weak sections that could be susceptible to overstress induced failures, a surrogate model may be generated by running FEA simulations offline using a pre-sampled number of cases, which have been determined with an design of experiment method and domain knowledge of the problem. The load rating may then be determined instantly and conservatively upon receiving inputs of the measured geometry and material properties.

In one or more embodiments, an asset management system can include a field asset management system; a maintenance management system; and a digital avatar associated with a specific asset.

The digital avatar comprises an automatic model that is customized for the associated asset. The digital avatar is in communication with a processor, and the processor is configured to automatically provide updated information from the field asset management system, the maintenance management system, or both after information associated with the asset is entered into at least one of the field asset management system or the maintenance management system. The processor is also configured to automatically run the automatic model with the new information and provides a new operating parameter for use by at least the field asset management system.

In one or more embodiments, the asset is a tool housing, and the digital avatar comprises several models for distinct points along the tool housing. The points can be selected using engineering judgment, and one skilled in the art with the aid of this disclosure would know where to select the points on the housing.

In one or more embodiments, an asset management system comprises a database and a model management system. The model management system can include a data management module and one or more models. The data management module configures a processor to receive new input data that is provide to the database, identify the asset associated with the new input data, and the parameters associated with the new input data. The processor is further configured to automatically provide at least a portion of the new input data to a model as input data and to run the model at least once to receive a new output based on the new input data.

In one or more embodiments, the processor is further configured to automatically provide the new output to the database as an operation parameter for the associated asset. In one or more embodiments, the processor can be configured to provide the output from a first model to a second model as an input, and then provide the output from the second model as to the database as a new operational parameter.

One or more embodiments of the asset management method can include customizing a digital avatar template to correspond to a unique asset. The customization can include using manufacturing information that includes unique geometry, an asset identification code, and measured material properties of the asset to customize an automatic model; thereby, forming an asset digital avatar. The automatic model can be configured to provide at least one operating parameter of the asset as an output.

In one or more embodiments, the method can also include linking the asset digital avatar to existing company systems and automatically updating the asset digital avatar, with at least one processor, as new information on the associated asset is entered into the company systems. The method can also include automatically running the model with the new output, using the at least one processor in communication with the asset digital avatar and automatic model, to generate a new output; and automatically providing the new output to at least one of the company systems, using the at least one processor.

The at least one processor is a plurality of distributed processors. In one or more embodiments, different ones of the plurality of processors can be configured to perform the method. For example, a first processor of the plurality of processors can automatically update the asset digital avatar as new information on the associated asset is entered into the company systems; a second processor of the plurality of processors in communication with the asset digital avatar and automatic model and can automatically run the model with the new output to generate a new output; and a third processor can automatically provide the new output to at least one of the company systems. In one or more embodiments, the at least one processor can be one processor.

In one or more embodiments, the asset management system can include an asset digital avatar that is combined, for example linked, with a second asset digital avatar. The automatic models of the asset digital avatars can use input data associated with each asset to identify a system operation parameter. For example, new data associated with a first component of an asset can have a first digital avatar and at least one first automatic model, new data associated with an input of the at least one first automatic models can be provided to the at least one first automatic model, and a new output from the at least one first automatic model can indicate one operating parameter, such as maximum tensile strength, for the first component, and a second component of the asset can have a second digital avatar and at least one second automatic model, new data associated with an input of the at least one second automatic model can be provided to the at least one second automatic model, and a new output from the at least one second automatic model can indicate one operating parameter, such as maximum tensile strength, for the second component, and the processor can be configured to compare the operating parameters for each component and select the lowest or highest as the system operating parameter. For example, the first component can be a weak point allowing the asset to connect with a cable, and the second component can be a joint of connecting a first portion of the housing to a second portion of the housing, and the new operation parameter for the first component, which in this case can be the maximum tensile strength for the weak point, can be greater than the new operation parameter, e.g. which in this case can be the maximum tensile strength for the joint, in which case the processor would select the joint as the operational parameter for the system or asset. If the new operation parameter was temperature, the processor would select the lowest temperature of the operation parameter. In essence depending on which operational parameter of the plurality of the digital avatars would most significantly limit the operational scope of the complete system, it will be selected as the system operational parameter.

In one or more embodiments, the asset management system can be configured using one or more company systems to perform operational planning for a fleet of assets, for example the system can continuously receive updated operational parameters for each asset, and can compare the update operational parameters to job requirements in a plurality of geographical locations, and can adjust deployments of the assets to the geographical locations that will maximize each assets ability to be used in the geographical location. For example, North America may have job specifications that only require tools with pressure ratings of 10 KPSI, and Asia may have job specifications that require tools with no less then 20 KPSI, accordingly assets with new operational parameters below 20 KPSI will be shipped to North America, and assets with new operational parameters above 20 KPSI will be shipped to Asia.

Although example assemblies, methods, systems have been described herein, the scope of coverage of this patent is not limited thereto. On the contrary, this patent covers every method, apparatus, and article of manufacture fairly falling within the scope of the appended claims either literally or under the doctrine of equivalents.

The invention claimed is:

1. An asset management system comprising:
   a field asset management system;
   a maintenance management system;
   a digital avatar associated with a particular tool housing, wherein the digital avatar comprises an automatic model that is customized for the particular tool housing based on manufacturing information related to the particular tool housing that includes at least one material property, geometry, and at least one failure mode of the particular tool housing, wherein the automatic model is configured to run and calculate a pressure rating related to pressure induced collapse of the particular tool housing;
   at least one processor; and
   a tangible, non-transitory, computer-readable medium, comprising instructions that, when executed by the at least one processor, cause the at least one processor to:
   automatically receive updated information related to the particular tool housing from at least one of the field asset management system and maintenance management system after information associated with the particular tool housing is entered into at least one of the field asset management system or the maintenance management system; and
   automatically run the automatic model of the digital avatar associated with the particular physical tool housing with the updated information such that the automatic model calculates an updated pressure rating related to pressure induced collapse of the particular tool housing based on the updated information for use by at least the field asset management system or the maintenance management system.

2. The system of claim 1, wherein the digital avatar comprises a plurality of automatic models for distinct points along the particular tool housing.

3. An asset management method comprising:
   customizing a digital avatar template to correspond to a particular tool housing, wherein the customizing comprises using manufacturing information related to the particular tool housing that includes geometry, at least one material property, and at least one failure mode of the particular tool housing to customize an automatic model that is part of an asset digital avatar, and wherein the automatic model is configured to calculate a pressure rating related to pressure induced collapse of the particular tool housing;
   linking the asset digital avatar to existing company systems;
   automatically updating the asset digital avatar, with at least one processor, as new information on the particular tool housing asset is entered into the company systems;
   automatically running the automatic model of the asset digital avatar based on the new information, with the at least one processor, to calculate an updated pressure rating related to pressure induced collapse of the particular tool housing; and
   automatically providing the updated pressure rating related to pressure induced collapse of the particular tool housing to at least one of the company systems, using at least one processor.

4. The method of claim 3, wherein the at least one processor is a plurality of distributed processors.

5. The method of claim 3, wherein at least one of the company systems is configured to compare new asset parameters to job specifications, and automatically reassigns a tool housing to a location that allows for best utilization of the tool housing.

6. The system of claim 1, wherein the updated information comprises a duration that the particular tool housing was utilized.

7. The system of claim 1, wherein the updated information is selected from at least one material property of the particular tool housing, a geometry of the particular tool housing, or maintenance information related to the particular tool housing.

8. The method of claim 3, wherein the new information comprises a duration of maintenance performed on the particular tool housing.

9. The method of claim 3, wherein the new information is selected from at least one material property of the particular tool housing, a geometry of the particular tool housing, or maintenance information related to the particular tool housing.

10. The method of claim 3, further comprising:
    identifying one or more positions associated with the particular tool housing; and
    automatically running the automatic model of the asset digital avatar, with the at least one processor, to calculate the pressure rating related to pressure induced collapse of the particular tool housing at the one or more identified positions.

11. The method of claim 3, wherein the automatic model is based on a finite element analysis model parameterized by at least one critical dimensional parameter of the particular tool housing.

12. The method of claim 11, wherein the at least one critical dimensional parameter is selected from an inner diameter, outer diameter, or eccentricity.

13. The method of claim 11, wherein the finite element analysis model includes at least one load type selected from pressure, bending, or tension.

14. The method of claim 11, wherein the finite element analysis model is related to a particular section of the tool housing identified for pressure rating prediction.

15. The method of claim 11, wherein the automatic model comprises a surrogate model derived from pressure rating predictions output by the finite element analysis model.

16. The method of claim 3, wherein the automatic model is further configured to predict a load rating related to overstress of the particular tool housing.

17. The method of claim 16, wherein the automatic model is based on a finite element analysis model parameterized by geometry of the particular tool housing.

18. The method of claim 17, wherein the automatic model comprises a surrogate model derived from load rating predictions output by the finite element analysis model.

19. The system of claim 2, wherein the automatic model is based on a finite element analysis model parameterized by at least one critical dimensional parameter of the particular tool housing.

20. The system of claim 19, wherein the at least one critical dimensional parameter is selected from an inner diameter, outer diameter, or eccentricity.

21. The system of claim 19, wherein the finite element analysis model includes at least one load type selected from pressure, bending, or tension.

22. The system of claim 19, wherein the finite element analysis model is related to a particular section of the tool housing identified for pressure rating prediction.

23. The system of claim 19, wherein the automatic model comprises a surrogate model derived from pressure rating predictions output by the finite element analysis model.

24. The system of claim 2, wherein the automatic model is further configured to predict a load rating related to overstress of the particular tool housing.

25. The system of claim 24, wherein the automatic model is based on a finite element analysis model parameterized by geometry of the particular tool housing.

26. The system of claim 24, wherein the automatic model comprises a surrogate model derived from load rating predictions output by the finite element analysis model.

* * * * *